US012294149B2

(12) United States Patent
Shinton et al.

(10) Patent No.: US 12,294,149 B2
(45) Date of Patent: May 6, 2025

(54) RADIOFREQUENCY WINDOW

(71) Applicant: Elekta Limited, Crawley (GB)

(72) Inventors: Ian Shinton, Crawley (GB); Emma Wooldridge, Crawley (GB)

(73) Assignee: Elekta Limited, Crawley (GB)

( * ) Notice: Subject to any disclaimer, the term of this patent is extended or adjusted under 35 U.S.C. 154(b) by 264 days.

(21) Appl. No.: 17/595,888

(22) PCT Filed: May 29, 2020

(86) PCT No.: PCT/EP2020/065004

§ 371 (c)(1),
(2) Date: Nov. 29, 2021

(87) PCT Pub. No.: WO2020/239989

PCT Pub. Date: Dec. 3, 2020

(65) Prior Publication Data

US 2022/0231421 A1 Jul. 21, 2022

(30) Foreign Application Priority Data

May 31, 2019 (GB) ..................................... 1907809

(51) Int. Cl.
*H01Q 13/18* (2006.01)
*H01P 1/08* (2006.01)

(52) U.S. Cl.
CPC ............... *H01Q 13/18* (2013.01); *H01P 1/08* (2013.01)

(58) Field of Classification Search
CPC .................................. H01P 1/08; H01Q 13/18
See application file for complete search history.

(56) References Cited

U.S. PATENT DOCUMENTS 4,511,866 A 4/1985 Munson et al.

FOREIGN PATENT DOCUMENTS

EP 0657955 A1 6/1995

OTHER PUBLICATIONS

"Chinese Application Serial No. 2019-534173, Office Action dated Apr. 12, 2022", w English Translation, (Apr. 12, 2022), 18 pgs.
"International Application Serial No. PCT/EP2020/065004, International Search Report dated Aug. 4, 2020", (Aug. 4, 2020), 3 pgs.
"International Application Serial No. PCT/EP2020/065004, Written Opinion dated Aug. 4, 2020", (Aug. 4, 2020), 6 pgs.
"United Kingdom Application Serial No. 1907809.6, Examination Report dated Nov. 29, 2019", (Nov. 29, 2019), 5 pgs.
Dutta, Ranjit Kumar, et al., "Design and study of Cylindrical RF pill box window for 100 GHz BWO with Single side Tapered Output Coupler", 2017 14th IEEE India Council International Conference (INDICON). IEEE, (2017), 4 pgs.
Otake, Y., et al., "Design and high-power test of a TE11-mode X-band RF window with taper transitions", Proceedings Particle Accelerator Conference. vol. 3. IEEE, (1995), 3 pgs.

(Continued)

*Primary Examiner* — Andrea Lindgren Baltzell
*Assistant Examiner* — Kimberly E Glenn
(74) *Attorney, Agent, or Firm* — Schwegman Lundberg & Woessner, P.A.

(57) ABSTRACT

Disclosed is an RF window. The RF window comprises a first and a second cavity and a plate of dielectric material positioned there between. At least one of the first and second cavities comprises a taper, beginning at the plate, such that the at least one of the first and second cavities reduces in diameter in a direction away from the plate.

19 Claims, 5 Drawing Sheets

(56) References Cited

OTHER PUBLICATIONS

"European Application Serial No. 18207112.6, Office Action dated Apr. 7, 2023", (Apr. 7, 2023), 6 pgs.
"Chinese Application Serial No. 202080040173.X, Office Action dated Nov. 4, 2022", w English Translation, (Nov. 4, 2022), 9 pgs.
"Chinese Application Serial No. 202080040173.X, Office Action dated Apr. 12, 2023", w English Translation, (Apr. 12, 2023), 8 pgs.
"European Application No. 20729737.5, Office Action dated Jul. 4, 2023", (Jul. 4, 2023), 6 pgs.
"United Kingdom Application Seral No. 1907809.6, Examination Report dated Jan. 6, 2022", (Jan. 6, 2022), 2 pgs.
"European Application No. 20729737.5, Office Action dated Feb. 27, 2025", (Feb. 27, 2025), 7 pgs.
Bogdashov, Alexandr, et al., "Oversized K a-Band Traveling-Wave Window for High-Power Transmission", EEE transactions on microwave theory anbd techniques 54.12, (2006), 4130-4135.

RADIOFREQUENCY WINDOW

PRIORITY APPLICATIONS

This application is a U.S. National Stage Filing under 35 U.S.C. § 371 from International Application No. PCT/EP2020/065004, filed on May 29, 2020, and published as WO2020/239989 on Dec. 3, 2020, which claims the benefit of priority to United Kingdom Application No. 1907809.6, filed on May 31, 2019; the benefit of priority of each of which is hereby claimed herein, and which applications and publication are hereby incorporated herein by reference in their entireties.

This disclosure relates to the propagation and transmission of electromagnetic radiation, and in particular relates to a radiofrequency (RF) window design for high power RF systems.

BACKGROUND

Radiofrequency (RF) windows are used in RF systems and devices, and have applications in accelerators used for medical, defence and research purposes. To guide RF from one location to another in an RF system, it is typical to use a suitable arrangement of RF transmission lines and/or waveguides. RF windows can be used as pressure barriers to separate different parts of the RF system, for example waveguide cavities, under different pressures.

An RF window in accordance with a prior design is shown in FIG. 1. The design can be described as a traditional 'pill-box' RF window design. As is common in the art, the figure shows the RF cavity, or cavities, through which the RF propagates. The cavities shown may be formed by a suitably shaped and configured waveguide structure(s). FIG. 1 shows an RF window 112 which forms an interface between a first cavity 102 at a particular vacuum pressure, and a second cavity 110 at a different vacuum pressure. In the figure, the different pressures in the system are represented using different degrees of shading. The RF window is formed of a first cylindrical cavity 104, a second cylindrical cavity 108, and a ceramic plate or disc 106 positioned therebetween. Cavities 102, 110 have a generally rectangular cross-section and may be formed by standard rectangular waveguide structures.

As is known in the art, only certain frequencies and forms of electromagnetic radiation will propagate in an optimal manner through a waveguide. The electric and magnetic fields which form the electromagnetic radiation may take any of a number of different forms, or configurations, depending on the conditions imposed by the waveguide. These forms, or configurations, are known as modes. The shape and configuration of the waveguide cavity affects the 'type' of mode which may form in the cavity. In the design shown in FIG. 1, the propagation of modes is from a rectangular mode configuration in the first cavity 102, to a cylindrical mode configuration in the RF window 112, and back to a rectangular mode configuration in the second cavity 110. FIGS. 2*a* and 2*b* show higher-order cylindrical modes in the RF window 112, with both orders being above the fundamental order.

The general aim when designing an RF window is to maximise the power transmission of RF through the barrier for a desired frequency range, while minimising losses such as those due to reflection and heat generated at the ceramic plate 106. It is therefore desirable to design an RF window which does not have any higher order modes having a resonant frequency at or near the frequency of RF being transmitted through the RF window. Such modes are termed trapped modes. Trapped modes at or near the RF transmission frequency (also referred to as the frequency of operation) not only lead to the inefficient transmission of RF power, but potentially also to the build-up of heat and the consequent breakdown of the RF window due to cracks and vacuum leaks in the ceramic plate 106.

Traditionally, the mechanism of moving a trapped mode, i.e. of adjusting its frequency so as to be sufficiently far from the desired RF transmission frequency, is to alter the length or radius of the RF window cavities. In other words, and with reference to FIG. 1, the traditional mechanism of moving a trapped mode would be to adjust the length or radius of one or both of the first and second cylindrical cavities 104, 106. However, space may be limited in RF systems, in particular for medical applications, and creating longer and larger RF windows is not always feasible. There are also disadvantages associated with increasing the size of an RF window, such as increased material costs and manufacturing complexity. It has long been accepted in the art that these disadvantages are the 'price to be paid' when optimising an RF window design.

While the RF window design shown in FIG. 1 operates well and its design can be adjusted to shift the frequency of trapped modes in the traditional manner, it has been found that this design can be improved upon still further and the present invention seeks to address the above-described and other disadvantages encountered in the prior art by providing an improved RF window.

SUMMARY

Aspects and features of the present invention are set out in the claims.

According to a first aspect, an RF window is provided which comprises a first and a second cavity and a plate of dielectric material positioned therebetween. At least one of the first and second cavities comprises a taper such that the at least one of the first and second cavities reduces in diameter in a direction away from the plate. The taper begins at the plate.

By providing an RF window in which a taper begins at the dielectric plate, spherical modes form as RF travels through the RF window.

Optionally, at least one of the first and the second cavity is substantially frustoconical.

Optionally, at least one of the first and second cavities is the first cavity, the taper is a first taper, and the direction is a first direction. The second cavity comprises a second taper such that the second cavity reduces in diameter in a second direction away from the ceramic plate. The second taper may also begin at the plate, in a similar manner to the first taper. The first and second directions may be antiparallel to one another.

By providing an RF window with two tapers, or two tapered cavities, wherein both tapers begin at the plate, cylindrical modes cannot form in the vicinity of the dielectric plate. Instead, spherical modes form. This gives rise to advantages as will be discussed in detail herein.

Optionally, the RF window comprises a central axis along which the direction lies. Optionally, both the first and the second direction lie along this central axis, though the first and second directions are opposed to one another. The central axis may define an axis of rotational symmetry of the RF window.

Optionally, the taper may form an angle, internal to the cavity, of θ with the central axis, wherein preferably 35°<θ<55°, even more preferably 40°<θ<47°, and even more preferably θ might be substantially 43°. The first and second cavity may take substantially the same shape. Internal to the first and second cavities, the first and the second taper may form the same angle, θ, with the central axis.

Optionally, the RF window is optimised for use with RF at a transmission frequency, and one or both of a length of the first cavity along the first direction is less than a wavelength of the RF at the transmission frequency; and a length of the second cavity along the second direction is less than a wavelength of the RF at the transmission frequency.

This is completely in contrast with prior designs, and is advantageous as a more compact design is provided.

Optionally, a length of the first cavity along the first direction is less than a radius of the plate, and/or a length of the second cavity along the second direction is less than a radius of the plate.

Optionally, the plate is chamfered around its edges such that it is held in place between the first and the second cavity by virtue of the first and the second taper.

Optionally, the first cavity comprises a first inner face and a first outer face; and/or the second cavity comprises a second inner face and a second outer face. The first direction may be from the first inner face to the first outer face; and/or the second direction may be from the second inner face to the second outer face. The dielectric plate may define or be located at the first and the second inner faces. Optionally, the first taper joins the first inner face to the first outer face such that the first cavity is substantially frustoconical; and/or the second taper joins the second inner face to the second outer face such that the second cavity is substantially frustoconical. Optionally, a diameter of the first inner face is larger than a diameter of the first outer face; and/or a diameter of the second inner face is larger than a diameter of the second outer face.

The RF window may comprise at least one waveguide structure which comprises the first and second cavities. The at least one waveguide structure may comprise a first and a second waveguide structure; the first waveguide structure comprising the first cavity and the second waveguide structure comprising the second cavity.

Optionally, the first waveguide structure comprises a first aperture to allow RF to enter the first cavity; and/or optionally the second waveguide structure comprises a second aperture to allow RF to exit the second cavity. The first aperture may define a first outer face of the first cavity; and/or the second aperture may define a second outer face of the second cavity.

Optionally, the dielectric material may be a ceramic. The plate may be a disc.

Optionally, the RF window is configured such that spherical RF modes form in the RF window as RF propagates through the RF window.

Optionally, neither the first nor the second cavity is cylindrical.

Optionally the RF window is configured to be coupled with a first connecting cavity and with a second connecting cavity such that, when so coupled, the RF window is positioned between the first and the second connecting cavities. Optionally, the RF window is configured such that, when so coupled, an interface forms where the first connecting cavity meets the RF window, and, at the interface, a diameter of the first connecting cavity is less than a diameter of the first cavity.

According to another aspect, an RF system comprising the RF window described herein is provided. The RF system comprises a first connecting cavity coupled to the first cavity; and a second connecting cavity coupled to the second cavity.

Optionally, the RF system comprises an interface where the first connecting cavity meets the first cavity, and wherein, at the interface, a diameter of the first connecting cavity is less than a diameter of the first cavity.

FIGURES

Specific embodiments are now described, by way of example only, with reference to the drawings, in which:

FIG. 1 depicts an RF system comprising an RF window in accordance with the prior art;

FIGS. 2*a* and 2*b* depicts cylindrical trapped modes in the RF window of FIG. 1;

FIG. 3*a* depicts an RF system comprising an RF window in accordance with the present disclosure;

FIG. 3*b* depicts a cross-section through an RF system comprising an RF window in accordance with the present disclosure;

FIGS. 4*a* and 4*b* depict spherical trapped modes in the RF window of FIG. 3;

DETAILED DESCRIPTION

Broadly speaking, and without limitation, the present disclosure relates to an RF window comprising a ceramic plate positioned directly between two tapered, frustoconical cavities. It has been found that RF travelling through an RF window having the configuration described herein forms spherical modes. Traditionally, RF windows comprise a generally cylindrical central portion so as to introduce the well-known and well-understood cylindrical modes. To date, it has been thought to be too complex to optimise an RF window design which makes use of spherical modes in this manner, and so removing the cylindrical central portion and intentionally introducing spherical modes into the RF window goes against a prejudice in the art. The present RF window design also gives rise to several advantages, including the provision of a more compact RF window, and an RF window which has trapped modes which are separated by greater frequency gaps, hence simplifying the design and optimisation of the RF window for a particular range of RF transmission frequencies. These and other advantages will be described herein.

Figure 1:
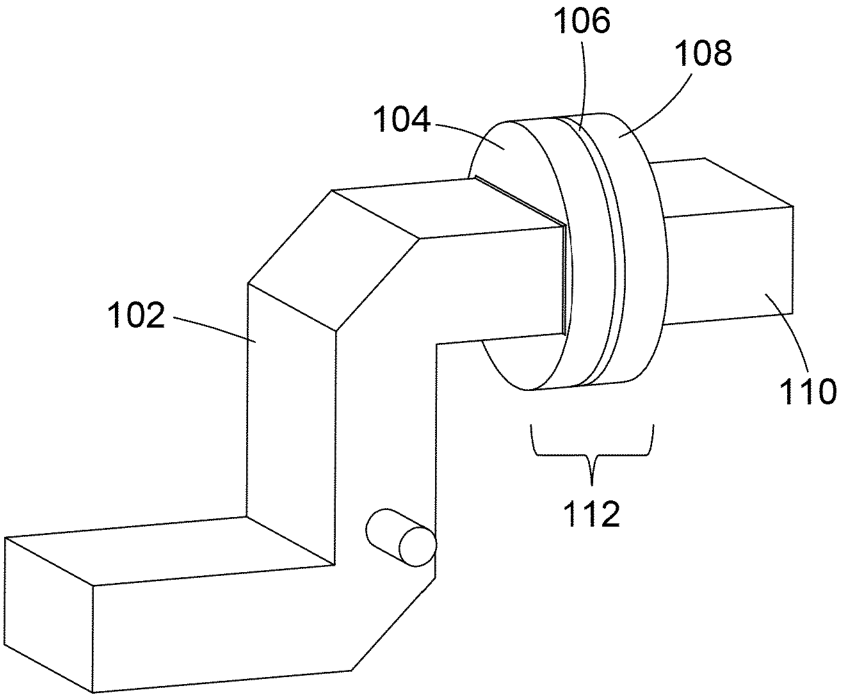
Figure 2A:
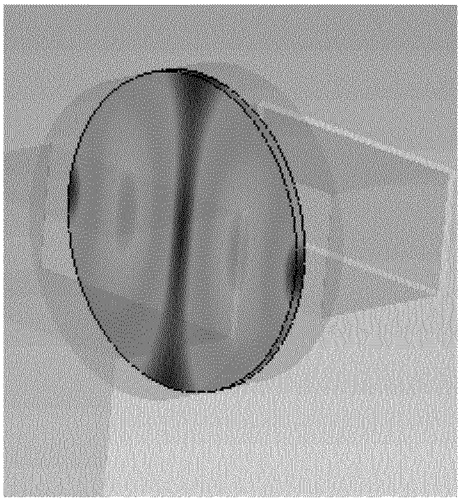
Figure 2B:
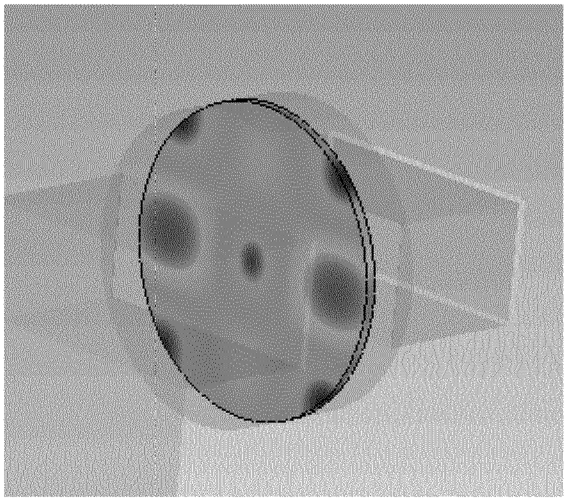
Figure 3A:
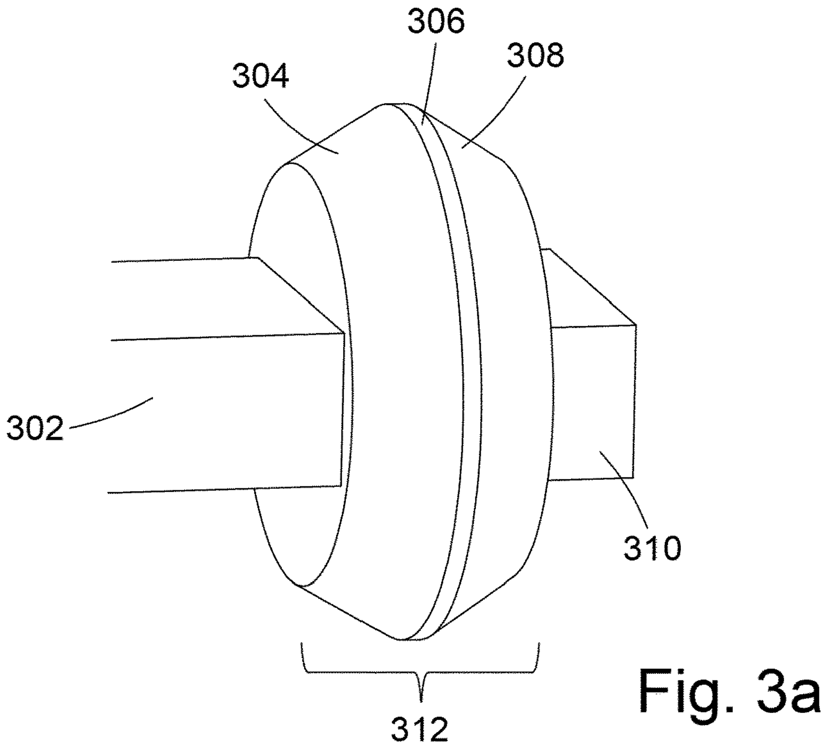
Figure 3B:
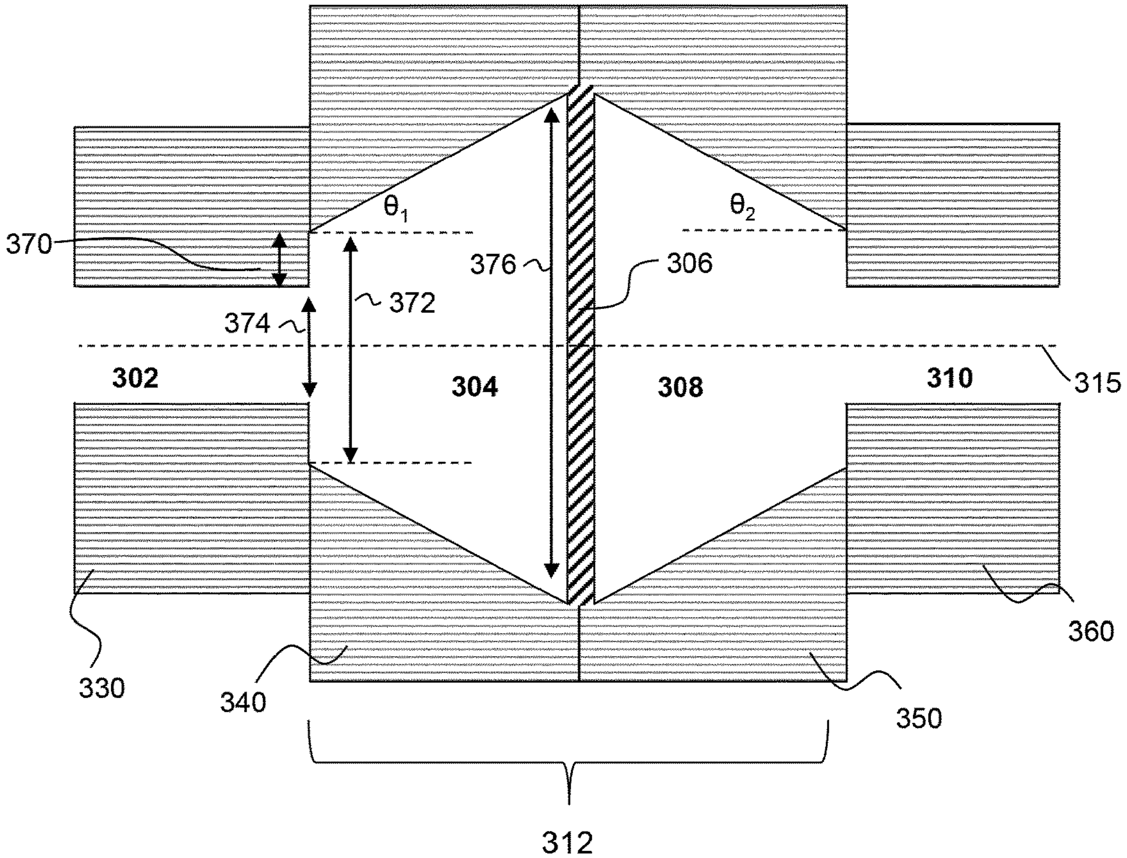

FIG. 3*a* depicts an RF system comprising an RF window 312 in accordance with the present disclosure. As with FIG. 1, FIG. 3*a* depicts the shapes of the cavities, which can be formed by an appropriately shaped and configured waveguide structure or structures. Where the cavities are described as having faces, tapers, apertures and the like, it will be understood that the RF window comprises one or more waveguide structures which define, or comprise, the cavities, and the one or more waveguide structures are configured such that the cavities comprise the features described herein. FIG. 3*b* depicts a cross-section through an RF window 312, and shows an example of the waveguide structure, or structures, which may be used to form the RF cavities shown in FIG. 3*a*. Like reference numerals are used for like parts where suitable.

The RF window 312 comprises a first cavity 304 and a second cavity 308. The RF window 312 may comprise one or more waveguide structures which comprise the cavities, for example a first waveguide structure which comprises the first cavity 304 and a second waveguide structure which comprises the second waveguide cavity 308. The first and second cavities 304, 308 may be described as RF window cavities. The first and second cavities 304, 308 are separated by a ceramic plate 306. The ceramic plate 306 may be a disc, or be disc shaped. In other words, the ceramic plate 306 may be substantially circular.

When the RF window 312 forms part of an RF system, the first cavity 304 is coupled with a first connecting cavity 302, and the second cavity 308 is coupled with a second connecting cavity 310.

The connecting cavities 302, 310 are termed such because they connect to, and/or couple with, the RF window cavities 304, 308. The connecting cavities 302, 310 form part of different regions of the RF system, and these regions may be held at different pressures. A purpose of the RF window 312 is to separate these two regions of differing pressure in the RF system. As such, the RF window is configured to withstand high pressures and very low pressures (strong vacuum). For example, in a medical accelerator, the RF system may be held at a pressure of 2-6 bars in a first region of the system which comprises the source of RF, depending on the type of gas filling this region of the system. For example, the region may be filled with a gas such as SF6, or with dry air. A second region of the system which incorporates the particle accelerator may be held at very low pressure (high vacuum), for example between $10^{-5}$ Pascals and $10^{-8}$ Pascals. The present RF window can withstand a pressure differential of this magnitude.

FIG. 3*b* depicts a cross-section through the RF window 312 depicted in FIG. 3*a*. Whereas FIG. 3*a* depicts only cavities, FIG. 3*b* depicts a suitable arrangement of waveguide structures which may be used to form the cavities.

FIG. 3*b* shows an RF system comprising a first connecting waveguide structure 330 which comprises the first connecting cavity 302; a first RF window waveguide structure 340 which comprises the first RF window cavity 304; a second RF window waveguide structure 350 which comprises the second RF window cavity 308; and a second connecting waveguide structure 360 which comprises the second connecting cavity 310. It will be appreciated that, while reference is made to separate first and second waveguide structures 340, 350, when the RF window 312 is constructed these waveguide structures are likely to be coupled together, connected, and in most designs permanently brazed together. Therefore, the first and second waveguide structures 340, 350 may be described as a single RF window waveguide structure.

In use, RF travels from the first connecting cavity 302 and into the first RF window cavity 304. The RF travels through the ceramic plate 306 and into the second RF window cavity 308. The RF then travels into the second connecting cavity 308. This description defines a direction of RF travel. The RF window may define an RF propagation path, i.e. from the first RF cavity 304 of the first waveguide structure, through the ceramic plate 306, and into the second RF window cavity.

The first connecting cavity 302 forms part of an arrangement of waveguides which guides RF to the RF window, for example from a source of RF such as a magnetron or klystron. The second connecting cavity 310 forms part of an arrangement of waveguides which guides RF away from the RF window. In other words, the second connecting cavity 310 guides the RF passing through the RF window elsewhere in the RF system, such as to a particle accelerator. Typically, the pressure inside a particle accelerator must be kept very low, i.e. there must be a strong vacuum. In this example, the RF window serves to separate a region of the RF system which comprises the source of the RF from another region of the RF system which comprises a particle accelerator, such that these different regions can be held at a suitable pressure for their operation. Pressures may be maintained in the various regions of the RF system using vacuum pumps in a known manner and this will not be discussed in detail herein.

In FIGS. 3*a* and 3*b*, the connecting cavities 302, 310 have a rectangular cross-section, however these cavities may have other cross-sectional shapes such as circular cross-sections. The cavities 302, 310 are formed by an appropriately configured and shaped waveguide, such as a WG-10 waveguide. The rectangular connecting cavities 302, 310 have a width which is twice their height. The height of the connecting cavity 302 is depicted in FIG. 3*b* via arrow 374.

The first and second waveguide structures 340, 350 which comprise the first and second RF window cavities 304, 308, are configured such that the first and second cavities 304, 308 are frustoconical, i.e. have the shape of a truncated cone. As such, each of the first and second RF window cavities 304, 308 comprise two faces: an inner and an outer face. These faces are both circular. The inner circular faces are coupled with, and/or are in contact with, and/or are defined by, the ceramic plate 306. The ceramic plate 306 is located at the inner circular face of each RF window cavity 304, 308. The plate 306 may be described as being positioned between the first and the second inner faces. The diameter of the inner face of the first cavity 304 is indicated via arrow 376 in FIG. 3*b*, and the diameter of the outer face of the first cavity 304 is indicated via arrow 372. The outer faces may be coupled with different regions of the RF system. When the RF window 312 is not coupled with the connecting cavities 302, 310, i.e. when the connecting waveguide structures 330, 360 depicted in FIG. 3*b* are not present, the outer faces of the RF window cavities can be described as outer apertures in the RF window waveguide structure.

At least one of the first and second cavities 304, 308, and preferably both of the first and second cavities 304, 308, comprises a taper such that the cavity reduces in diameter in a direction away from the plate 306. In an implementation, the first cavity 304 comprises a first taper and the second cavity 308 comprises a second taper. The cavity tapers are formed by tapered walls of suitably configured waveguide structure(s), as can be seen from FIG. 3*b*. The tapering of the first and second cavities between their respective inner and outer faces forms the frustoconical shape of each cavity 304, 308. In other words, the first taper joins the first inner face to the first outer face such that the first cavity is substantially frustoconical, and the second taper joins the second inner face to the second outer face such that the second cavity is substantially frustoconical. The tapers begin at the plate, or equivalently begin at the inner face of each cavity. The taper may be described as beginning immediately at, or from, the ceramic plate 306 and/or immediately at, or from, the inner face of the cavity. In this way, it will be appreciated that there is no cylindrical cavity surrounding, or in the vicinity of, the RF window. In part, it is this feature of the RF window which means that cylindrical modes do not form in the RF window.

With reference to the implementation depicted in FIG. 3*b*, the first waveguide structure 340 defines the shape of the first RF window cavity 304, and the second waveguide structure 350 defines the shape of the second RF window cavity 308. The first and second waveguide structures 340, 350 are shaped and/or configured such that the first and second RF window cavities 304, 310 each have outer circular faces with diameters which are smaller than the diameters of their inner circular faces. This can be seen via inspection of arrows 372, 376 in FIG. 3*b*. The first waveguide structure 340 is configured such that the outer circular face of the first RF cavity 304 is joined with the inner face of the first RF window cavity 304 via a first annular tapered wall which defines the frustoconical shape of the first RF window cavity 304. Similarly, the second waveguide structure is configured such that the outer circular face of the second RF cavity 304 is joined with the inner face of the second RF window cavity 304 via a second annular tapered wall which defines the frustoconical shape of the second RF window cavity 304.

At least one of the first and second RF window cavities 304, 310 reduces in diameter in a direction away from the ceramic plate 306. In the implementation depicted in FIG. 3*a*, the first cavity 304 reduces in diameter in a first direction away from the ceramic plate, and the second cavity 308 reduces in diameter in a second direction away from the ceramic plate. The first and second direction are opposite to one another. The first and second direction are parallel but opposed to one another, and as such are antiparallel with one another.

The RF window 312 has a central axis 315. The central axis 315 passes through the centre of the ceramic plate 306, and the central axis defines an axis of rotational symmetry for the ceramic plate 306, for the first and second RF window cavities 304, 308, and for the RF window 312 generally. The first and second directions lie along the central axis 315. The first direction lies in the same axis with, but is opposite, the direction of RF travel, and the second direction lies in the same axis as, and is parallel with, the direction of RF travel.

Where reference is made to 'diameter', it should be appreciated that this refers to a dimension or extent in a direction perpendicular to the central axis. In other words, at least one of the first and second RF window cavities 304, 310 reduces in a first dimension, in a direction away from the ceramic plate 306, wherein the first dimension is perpendicular to the central axis 315. Where reference is made to the diameter of the connecting cavities, it should be understood that these cavities may take any cross-sectional shape; for example, these cavities may be rectangular. Here, diameter simply means a straight line extending through the centre of the cavity, in a direction perpendicular to the central axis 315, and which defines the size or extent of the cavity in that direction. A cavity of rectangular ross-section therefore has two diameters, a height and a width.

In the implementation shown in FIGS. 3*a* and 3*b*, the first and second tapers of the RF window cavities 304, 308, and equivalently the first and second annular tapered walls of the waveguide structures 340, 350, are angled with respect to the central axis 315 of the RF window 312. The first tapered annular wall forms an angle $\theta_1$ with the central axis 315, and the second tapered annular wall forms an angle $\theta_2$ with the central axis. In a preferred implementation, the RF window cavities 304, 308 are equal in size and shape. In this implementation, $\theta_1=\theta_2$ such that the first and second annular tapered walls lie at the same angle with respect to the RF window central axis. It has been found that good performance can be achieved when $\theta_1$, $\theta_2$ are substantially equal, i.e. at least within 1-5° of one another. It has been found that good performance can be achieved when $35°<\theta_1$, $\theta_2<55°$. Further improved performance can be achieved when $40°<\theta_1,\theta_2<47°$. The optimal value of $\theta_1$, $\theta_2$ is substantially 42°. Both $\theta_1$ and $\theta_2$ may be described as a taper angle. The angle is measured inside the cavity in the manner indicated in FIG. 3*b*. The angle may therefore be described as an internal cavity taper angle, or an internal cavity angle.

The RF window 312 is optimised for use with RF at an RF transmission frequency. The transmission frequency may be the 'central' frequency of a transmission window or range of frequencies. For example, the transmission frequency may be, for example, 2.998 GHz (see the specific implementation and dimensions below), but the RF window may be designed to operate with and optimally pass RF at 2.998 GHz+/−10 MHz. The specific dimensions described below give rise to an implementation of the present design which is optimised such that there are no trapped modes in the RF window in this transmission frequency range. More generally, the RF window of the present disclosure may be optimised such that there are no trapped modes at or near any particular transmission frequency. This design optimisation is simplified because the spherical modes which form in the RF window 312 are separated by larger frequency gaps than the generally used cylindrical modes.

In prior designs, the ceramic must be placed centrally in the window and sit almost exactly at a position of a null point in the RF standing wave in the RF system. Any slight variation risks bringing the frequency of trapped modes closer to the operating frequency. However, because the trapped modes are separated by greater frequency gaps in the present design, there are larger tolerances for the placement of the ceramic in both the RF window and the RF system. In addition, modelling and testing has shown that the present design is largely invariant to bend angles in the connecting cavities.

The present RF window design is compact and makes optimal use of available space in the RF system. In a preferred implementation, the length of the RF window 312 is less than a wavelength of RF at the transmission frequency. The length of the RF window may be described as the distance between the outer face of the first RF window cavity 304 and the outer face of the second RF window cavity 308 along the central axis 315. This means that a length of the first cavity 304 along the first direction is less than a wavelength of the RF at the transmission frequency, and in fact the length of the first cavity is less than half the wavelength of RF at the transmission frequency. Similarly, a length of the second cavity 308 along the second direction is less than a wavelength of the RF at the transmission frequency, and in fact the length of the second cavity 308 is less than half the wavelength of Rf at the transmission frequency. This aspect of the design provides for a significantly more compact and more space-efficient design of RF window than prior designs.

In addition, a length of the first cavity 304 along the first direction, and in particular the length along the central axis 315, is less than a radius of the ceramic plate 306. Similarly, a length of the second cavity 308 along the second direction, and in particular the length along the central axis 315, is less than a radius of the ceramic plate. In a preferred implementation, the length of the RF window 312 is less than the radius of the ceramic plate 306.

FIGS. 3*a* and 3*b* show the RF window 312 coupled with connecting cavities 302, 310 to form an RF system, or part of an RF system. The outer faces of the RF window cavities

304, 308 meet the connecting cavities 302, 310. Equivalently, the first waveguide structure 340 meets and is coupled with the first connecting waveguide structure 330, and the second waveguide structure 350 meets and is coupled with the second connecting waveguide structure 360.

The RF window 312 is configured to be coupled with, or to, the connecting cavities 302, 310. As described above, when the RF window 312 is taken in isolation from the RF system, the outer faces of the first and second cavities 304, 308 can be described as apertures in the RF window 312 and/or the RF waveguide structures(s) 340, 350. When the RF window 312 is not coupled with connecting cavities 302, 310, i.e. when the connecting waveguide structures 330, 360 depicted in FIG. 3*b* are not present, it will therefore be appreciated that the first waveguide structure 340 comprises a first outer aperture. Similarly, the second waveguide structure 350 comprises a second outer aperture. It is this second outer aperture which defines the outer face of the second RF window cavity 308. The first cavity 304 is configured to be coupled with the first connecting cavity 302 via the first aperture, and the second cavity 308 is configured to be coupled with the second connecting cavity 310 via the second aperture. When so coupled, the RF window 312 is positioned between the first and the second connecting cavities 302, 310, to form the implementation that can be seen in FIG. 3*b*.

The diameter of the first outer aperture is indicated via arrow 372 in FIG. 3*b*. The first outer aperture allows the RF window 312 to be coupled to the first connecting waveguide structure 330 such that RF can propagate from the first connecting waveguide structure 330 and into the first waveguide structure 340. The diameter of the first inner face is indicated via arrow 376. The diameter 372 of the first outer aperture is less than the diameter 376 of the first inner face of the first RF window cavity 304.

Similarly, the second waveguide structure 350 comprises a second outer aperture, which defines the outer face of the second RF window cavity 308. The second outer aperture allows the RF window 312 to be coupled to the second connecting structure 360 such that RF can propagate from the second waveguide structure 350 into the second connecting waveguide structure 360. The second waveguide structure 350 also comprises a second inner face, which defines the inner face of the second RF window cavity 308. The diameter of the second outer aperture is less than the diameter of the second inner face.

In summary of the particular implementation depicted in FIGS. 3*a* and 3*b* then, the RF window 312 comprises a first and a second RF window cavity 304, 308. These cavities are frustoconical shaped, and the cavities 304, 308 each have both an inner and an outer circular face. The RF window 312 comprises suitable waveguide structure, for example a first and a second waveguide structure 340, 350, which define(s) the frustoconical cavities 304, 308. The first and second waveguide structures 340, 350 each have an outer aperture which defines the outer face of each cavity 304, 308. The RF window 312 is configured to be coupled with the first connecting waveguide 330 via the first outer aperture, and the RF window 312 is configured to be coupled with the second connecting waveguide 360 via the second outer aperture. When so coupled, the RF window forms an RF system, or part of an RF system.

In an RF system comprising the RF window 312 and the first and second connecting cavities 302, 310 described above, RF enters the RF window via the first connecting cavity 302 and leaves the RF window via the second connecting cavity 310. The diameter 374 of the first connecting cavity 302 is less than the diameter 372 of the first outer face, or equivalently the diameter 372 of the first outer aperture. Similarly, the diameter of the second connecting cavity 308 is less than the diameter of the second outer face, or equivalently the diameter 372 of the second outer aperture. The connecting cavities may take any of a number of different cross-sectional shapes such as circular or rectangular. While reference is made to the 'diameter' of the connecting cavities, in implementations in which the cavities are rectangular in cross-section then the diameters of the outer faces/apertures of the RF window 312 are larger than both the height and the width of the connecting cavities.

In a preferred implementation, the RF system is designed such that there is a step change in the size and/or diameter of cavity between the connecting cavities 302, 310 and the RF window cavities 304, 308. This step change can be appreciated upon inspection of FIG. 3*a*, and is indicated by arrow 370 in FIG. 3*b*. This step change is relatively abrupt, and there is little or no taper between the connecting cavities 302, 310 and the RF window cavities 304, 308. In part, it is this unusually abrupt step change, in particular between cavities of different cross-sectional shapes, which causes spherical modes to form in the RF window. In particular, it is the step change between the first connecting cavity 302 and the first RF window cavity 304 which causes the RF to form spherical modes as it travels through the RF window 312. In a disclosed implementation, there need only be a step change at this interface between the first connecting cavity and the RF window 312.

The RF system may therefore comprise a connecting cavity 302 coupled with, or connected to, the RF window 312, to form an interface. RF passes into the RF window 312 at this interface. The diameter 374 of the connecting cavity 302 at the interface is less than the diameter 372 of the RF window cavity 312 at this interface. In other words, there is an abrupt change in the size of cavity at the interface at which RF enters the RF window 312, and this step change, along with the shape of the RF window cavity or cavities, contributes toward the formation of spherical modes in the RF window 312. Where the connecting cavity or cavities is rectangular, it should be understood that, at the interface, the largest diameter of the connecting cavity 304 (typically the width) is less than the diameter of the first RF window cavity 304. A cavity of rectangular cross-section therefore has two diameters, a height and a width.

Figure 4A:
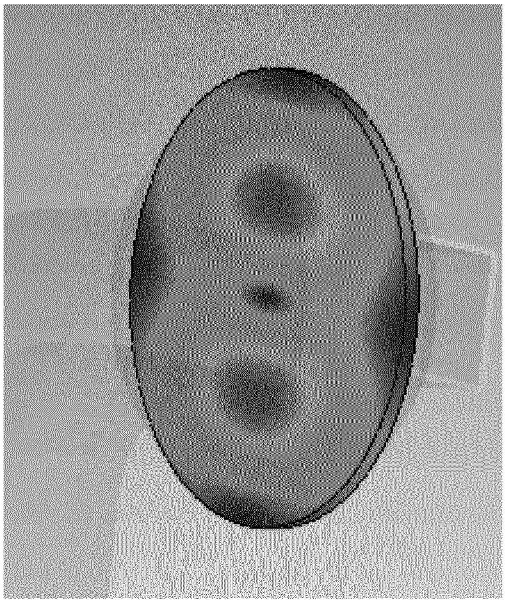
Figure 4B:
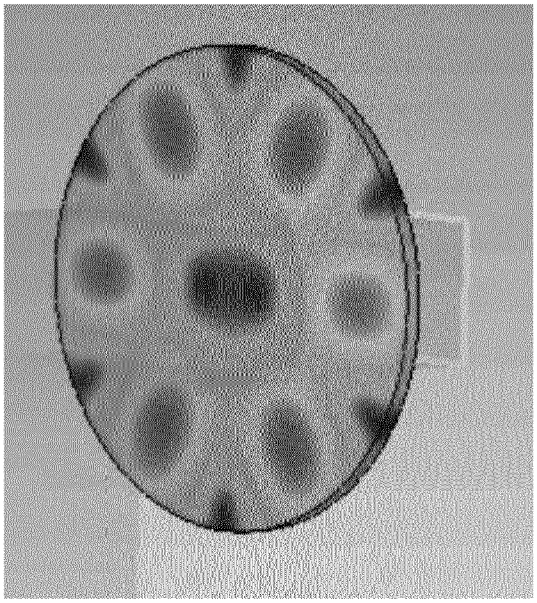

In use, the RF window is likely to form part of an RF system. RF is guided through the RF system from a source of RF by an arrangement of waveguides, which connects to the RF window via the first connecting waveguide structure 330. As the RF travels through waveguides which comprise cavities with rectangular cross-sections, for example the first connecting cavity 302 depicted in FIGS. 3*a* and 3*b*, the RF forms modes in a rectangular mode configuration. At the interface between the first connecting cavity 302 and the first RF window cavity 304, the RF abruptly changes its mode configuration. As the RF travels through the RF window, i.e. through the first cavity 304, the ceramic plate 306, and the second cavity 308, it forms modes in a spherical configuration. These spherical mode configurations are shown in FIGS. 4*a* and 4*b*. FIGS. 4*a* and 4*b* show higher-order spherical modes in the RF window 312, with both orders being above the fundamental order. As the RF travels out of the RF window 312 and back into a cavity with a rectangular cross-section, the RF reverts to forming modes in a rectangular configuration.

It will be appreciated that the present RF window is configured such that RF forms spherical modes as it passes through the RF window. The skilled person is able to determine, via inspection or testing of an RF window, what modes form as RF passes through the RF window. A number of tools are available to the skilled person to enable them to perform this inspection, for example the explanations and equations set forth in 'Microwave Engineering', a textbook by David M. Pozar, or via making use of Slater's perturbation theory. The type of mode configuration (e.g. cylindrical, rectangular, spherical) which RF forms as it travels through a guide or RF window may be determined using modelling software such as SUPERFISH CST microwave studio or high-frequency structure simulator (HFSS), or through experiment.

In a particular, specific RF window implementation designed for use with a magnetron having an operating frequency of 2.998 GHz: the radius of the ceramic disc, as indicated by arrow 376 in FIG. 3*b*, may be 58.00 mm; the length of the first and second RF window cavities along the RF window central axis may be 18.00 mm; and the diameter of each of the RF window cavity outer faces, indicated via arrow 374 in FIG. 3*b*, may be 41.25 mm. In this example, the angles which the tapered annular walls make with the central axis ($\theta_1$ and $\theta_2$) are approximately equal, and have a value of approximately 42-43°.

In an RF window with these dimensions, the frequency of the nearest trapped mode is approximately 3.200 GHz. It is generally accepted that the frequency of the nearest trapped modes should be at least +/−10 MHz different to the transmission/operating frequency, and the achieved difference in trapped mode frequency is significantly far from the operating frequency of 2.998 GHz.

Figure 5:
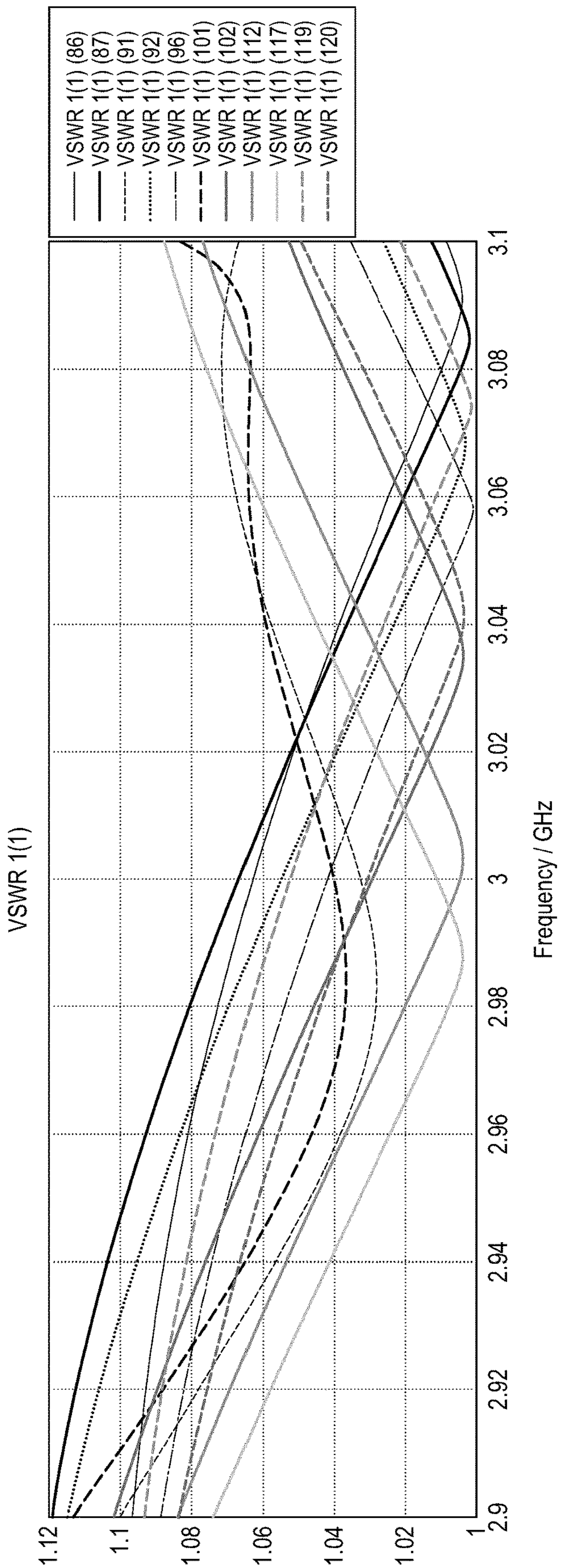
FIG. 5 depicts a graph showing VSWR versus operating/transmission frequency of RF.

FIG. 5 shows a graph of voltage standing wave ratio (VSWR) against operating frequency for a particular RF window design. The operating frequency of a source of RF may 'drift' and change as it operates, and thus it is desirable to provide a design of RF window that can optimally transmit RF at a 'window' or range of RF transmission frequencies. Any change in impedance along a transmission line will cause reflection. The measurement of the reflection is called the VSWR, Voltage Standing Wave Ratio. VSWR can therefore be described as a measure of how well the RF window design allows RF to propagate through it. For an optimal RF window design, the value of the VSWR should be as close to 1 as possible over the frequency range of interest. A spike or an abrupt discontinuity in the VSWR trace could indicate a trapped mode (only eigen mode analysis will definitely identify trapped modes rather than a VSWR plot) which could cause the ceramic to heat up and fail. An RF window having the specific dimensions described above demonstrates the behaviour depicted in FIG. 5 (which represents a parameter sweep in order to optimise the RF window), and it will be appreciated that the design has a low (flat) VSWR over the frequency range of interest (the operating frequency of 2.998 GHz+/−10 MHz).

As will be appreciated by the skilled person, the various features which comprise the RF window are appropriately sized depending on the RF frequency, or the window/range of RF frequencies, that the RF window is designed to optimally transmit. While a specific example with specific dimensions is disclosed herein for a magnetron operating frequency of 2.998 GHz, the skilled person given this 50 disclosure would be able to design an RF window according to the present disclosure optimised for use with any RF transmission frequency. For larger values of RF transmission frequency, the size of the Rf window is increased proportionally, and vice versa as the RF transmission frequency decreases.

The RF window can be fabricated using known methods and techniques, including brazing techniques, as will be known to the skilled person. The ceramic disc, or plate, can be comprised of any suitable ceramic material. In fact, whilst it is typical to use ceramic to form the gas barrier in an RF window, any suitable dielectric material may be used.

While reference is made to radiofrequency, RF, it will be appreciated by the skilled person that the RF window can be designed for other frequencies of electromagnetic radiation, in particular other high frequencies such as microwaves.

The presently disclosed RF window is advantageous for several reasons.

The frequency of RF produced by RF sources such as magnetrons and klystrons can 'drift' as the RF source operates. For example, for magnetrons, causes of this drift include the fluctuating temperature of the magnetron's anode, which may be affected by the amount of power supplied to the magnetron, the changing air temperature or pressure inside the magnetron's resonant cavity, and fluctuations in coolant flow rate or temperature. It is therefore beneficial to not only ensure there are no trapped modes at a particular transmission/operating frequency, but also that there are no trapped modes near a particular operating frequency.

Typically, RF windows comprise a central cylindrical section in which cylindrical RF modes form. These modes are well-understood, and it is possible to adjust the length of the cylindrical section in order to adjust the frequency at which trapped modes form, and thus it is possible to optimise prior RF windows for particular RF frequencies by adjusting the length of the central region of the window.

However, in contrast, the present RF window comprises at least one cavity which reduces in diameter in a direction away from the ceramic plate. This reduction in diameter, i.e. the taper of the cavity, begins at the ceramic. Accordingly, there is no cylindrical waveguide structure in the vicinity of or surrounding the ceramic, as in prior designs. An effect of this is that RF travelling through the RF window forms spherical modes, rather than the traditionally used cylindrical modes. By making use of spherical modes in this way, a more compact size of RF window can be achieved, both in terms of length (dimension along the central axis) and diameter (dimension perpendicular to the central axis), as compared to a traditional cylindrical shaped RF window offering the same or a similar frequency difference between the RF transmission frequency and the nearest trapped mode frequency. It has been observed that a particularly efficient shape of RF window cavity is the frustoconical shape depicted in FIGS. 3*a* and 3*b*.

Spherical modes are significantly more mathematically complex than cylindrical modes, and as such there has been a strong prejudice in the art against designing an RF window which makes use of spherical modes. To date, it has been widely accepted that the way to design an RF window is to have a central cylindrical region, and to then adjust its length or diameter in order to optimise the RF window for a particular transmission frequency. However, unexpectedly, the trapped spherical modes which form in the presently disclosed RF window are spread further apart in frequency than the trapped cylindrical modes which form in cylindrical RF windows. This allows greater design freedom when optimising the RF window for a particular transmission frequency, because it is simpler to fit in the desired operating frequency range between the trapped mode frequencies.

The present RF window was designed for use with a medical apparatus such as a radiotherapy device. Specifically, the RF window was designed for use with a radiotherapy device comprising a linear accelerator (linac). However, the RF window is useful for many other fields, and in particular implementations in which there are space restrictions.

Existing, prior RF windows are typically twice as long as the wavelength of the RF at the transmission frequency. The ceramic is placed between two cavities of length equal to this 'transmission wavelength', with the ceramic being placed at a null formed as the RF propagates through the window. While it may still be desirable to position the present RF window in the RF system such that the ceramic is positioned at a null, the lengths of the RF window cavities need not be as long as the 'transmission wavelength'. In fact, the length of each cavity in the present design may be significantly shorter than the transmission wavelength, and thus the present RF window may be optimally designed for a particular RF transmission frequency while being significantly shorter and more compact than previous RF window designs.

The ceramic disc 306 can be sized such that it exactly fits between the first and the second cavity 304, 308. In other words, the ceramic disc may have the same diameter as the inner faces of each of the first and the second cavities 304, 308. The ceramic disc 306 may be chamfered to allow it to fit perfectly between the two cavities (chamfering not shown in the figures). In this way, the first and the second waveguide structures 340, 350 can be brazed together with the ceramic positioned therebetween in a manner that removes the need for a ceramic holder or frame. This is important, as prior art devices have used cylindrical ceramic frames, and these frames introduce cylindrical modes into the RF window. These prior designs are in direct contrast with the present RF window, in which at least one of the first and second cavities comprises a taper which begins directly, or immediately, at the ceramic plate 306. By beginning the taper at the ceramic 306, and by the presence of two frustoconical cavities with a ceramic disc placed directly therebetween, the cylindrical cavities present in prior designs may be removed and therefore cylindrical modes may not form in the design. Also, by removing a central 'ceramic holder' or frame, the Rf window can be made even more compact and hence the design makes better use of space than prior designs.

Smaller, more compact RF windows have previously been difficult to manufacture due to the tight tolerances involved. Designers have therefore made use of longer windows to mitigate this problem and to allow for designs that make positioning the ceramic easier, for example a ledge in the waveguide structure for holding the ceramic. The frustoconical shape of the present RF widow cavities, and in particular the fact that a taper begins at the ceramic, makes positioning the ceramic far easier. For example, the ceramic may be held in place via a simple chamfering or bevelling of the ceramic disc, meaning the shape of the cavities alone is sufficient to hold the ceramic in place. Hence, the need for a ledge or complex jigs in production is mitigated or removed entirely. Should a small ledge be required, for example if a much lower frequency window were required, then this can be accommodated in the design as the spherical modes are spaced further apart and the small change in volume for the ledge should not move these models significantly nearer.

The RF window is designed such that, when it forms part of an RF system, there is a 'step change' between the diameter of the connecting cavities and the diameter of the RF window. This step change is described above and can be appreciated upon inspection of the transition between the diameter 374 of the first connecting cavity and the diameter 372 of the outer face of the first RF window cavity in FIG. 3*b*. Such step changes in combination with tapered cavities are in direct contrast with prior teaching in the field. It has previously been thought that, if a taper were to be adopted, for example a taper toward a cylindrical central section of an RF window in accordance 50 with prior designs, the change between the diameter of the connecting cavity and the diameter of the central section should be slow, gradual, and certainly not abrupt. This is because it has previously been thought that it would be beneficial to ensure that the impedance changes slowly in order to minimise reflection at the ceramic. However, by incorporating a relatively abrupt change in the manner described and shown in the figures, and by making use of spherical modes in the RF window, it has surprisingly been found that there in fact minimal reflection losses at the ceramic. This is relatively counter-intuitive and is not an approach that has been considered in the prior art to date.

The above implementations have been described by way of example only, and the described implementations and arrangements are to be considered in all respects only as illustrative and not restrictive. It will be appreciated that variations of the described implementations and arrangements may be made without departing from the scope of the invention.

Figure 6:
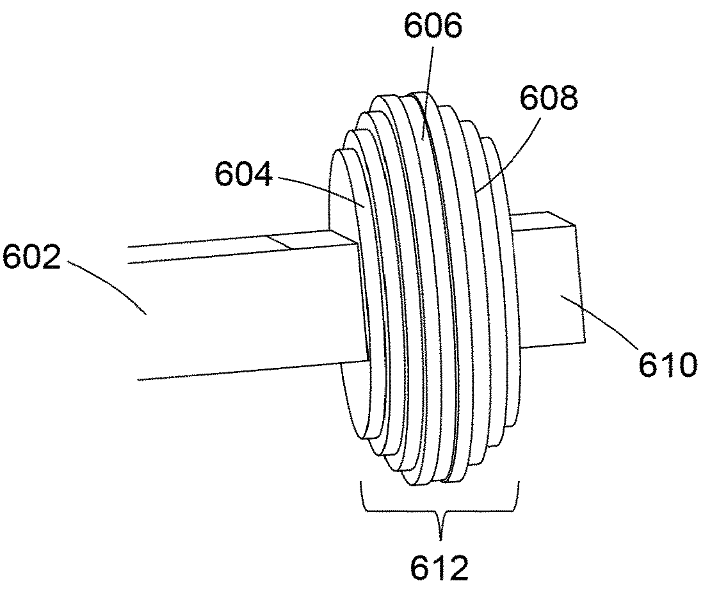
FIG. 6 depicts an RF system an alternative implementation of an RF window in accordance with the present disclosure.

FIG. 6 depicts an RF system comprising an alternative implementation of an RF window 712 according to the present disclosure. In a manner similar to FIGS. 1 and 3*a*, FIG. 6 depicts the cavities in the RF system. The RF system comprises a first connecting waveguide structure which comprises a first connecting cavity 602; a first RF window waveguide structure which comprises a first RF window cavity 604; a second RF window waveguide structure which comprises the second RF window cavity 608; and a second connecting waveguide structure which comprises the second connecting cavity 610.

The RF window 612, and the RF system, is identical to that described above, except the reduction in diameter in at least one of the first and second cavities 604, 608 is accomplished via a series of steps, e.g. a series of steps graduated in diameter. The RF window 612 comprises a first and a second cavity 604, 608 and a plate of dielectric material 606 positioned therebetween, and at least one of the first and second cavities comprises a taper such that the at least one of the first and second cavities reduces in diameter in a direction away from the plate, wherein the taper begins at the plate 606. In this implementation, the taper is comprised of a plurality of steps of successively decreasing diameter. Equivalently, the annular tapered wall of the waveguide structure(s) comprises a plurality of steps of successively decreasing diameter. Each step is annular and has a constant diameter along its length. The first and second RF window cavities 604, 608 depicted in FIG. 6 are substantially frustoconical and comprise inner and outer faces as described above. It will be appreciated that, given a sufficient number of steps, the shape of the cavity approximates a frustoconical shape. The greater the number of steps, the better the approximation to a frustoconical shape. A suitable number of steps has been found to be 5 or greater, and even more preferably 7 or greater.

In the implementation shown in FIG. 3*b*, the first and second cavities 304, 308 are equal in shape and size. The ceramic is chamfered and is held in place by virtue of the taper and/or by virtue of the frustoconical shape of the first and second RF cavities (the chamfering of the ceramic is not shown in figured 3*a*, 3*b*). However, the cavities need not be equally sized or shaped, and the RF window may comprise a ledge to facilitate placement of the ceramic.

Figure 7:
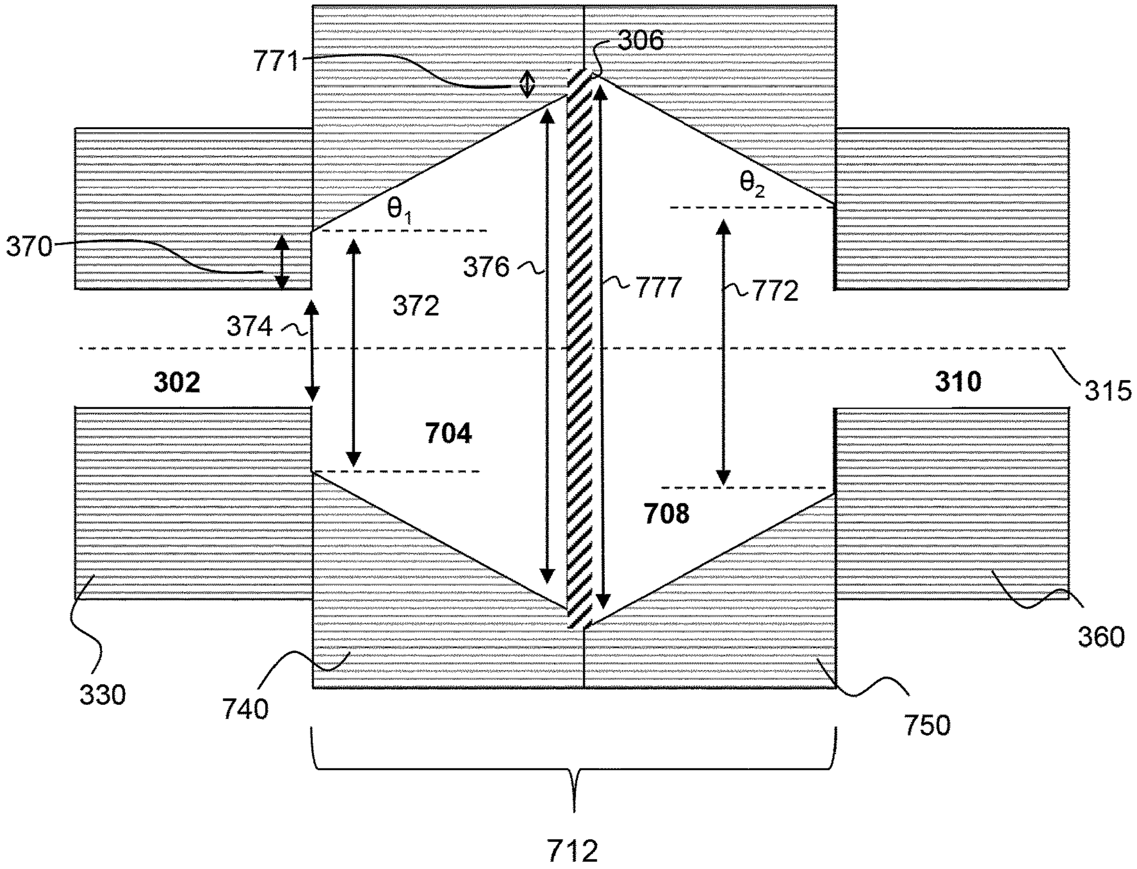
FIG. 7 depicts a cross-section through an RF system comprising an alternative implementation of an RF window in accordance with the present disclosure.

FIG. 7 depicts a cross-section through an RF system comprising an alternative implementation of an RF window in accordance with the present disclosure. The RF window 712, and the RF system, is identical to that described above, except where indicated in the description and in FIG. 7. Like reference numerals are used for like features, to aid understanding. In much the same way as described above in relation to FIG. 3*b*, the RF window 712 depicted in FIG. 7 comprises a first cavity 704 comprising a first inner face and a first outer face. The first inner face has a diameter 376, and the first outer face has a diameter 372.

The RF window 712 also comprises a second cavity 708 which comprises a second inner face and a second outer face. The second outer face has a diameter 772, and the second inner face has a diameter 777. However, in the implementation depicted in FIG. 7, the respective inner faces of the first and second cavities are different in size. In FIG. 7, the diameter 777 of the second inner face is larger than the diameter 376 of the first inner face. This creates an annular recess, or ledge, in which the ceramic 777 can be positioned. The depth of the recess, i.e. its dimension in the direction of the central axis 315 of the RF window 712, may be around 1 mm such that the annular recess can be used to position the ceramic in the RF window 712. In other words, the first waveguide structure 712 comprises an annular recess in which the ceramic 306 sits, which facilitates the positioning of the ceramic in between the first and second cavities 704, 708. In turn, this facilitates the fabrication of the RF window 712 as it is simpler to braze the waveguide structures 740, 750 together.

Increasing the size of the second inner face with respect to the first inner face results in several possible geometrical changes with respect to FIG. 3*b*. For example, the length of the second cavity 708 may be longer than the length of the first cavity 704 along the central axis 315, with the taper angle $\theta_2$ being equal to $\theta_1$. Alternatively, the lengths of the cavities might be equal, and the taper angles are different such that the respective sizes of the outer faces (372, 772) are equal. The angles $\theta_2$ and $\theta_1$ may differ by approximately 3°, for example. These and other implementations have been considered and form part of the present disclosure.

While the recess is shown as forming part of the first waveguide structure 740 in FIG. 7, the recess may instead form part of the second waveguide structure 750. In an alternative embodiment, both the first and the second waveguide structure 740, 750 comprise a recess. These recesses may, for example, have a depth which is substantially half the depth of the ceramic disc such that when the RF window is assembled the ceramic disc sits in both recesses and sits between the first and the second cavity. In other words, each waveguide structure may comprise a lip, ledge or recess as described above, where the lip, ledge or recess in sized such that, when the waveguide structures come together to form the RF window, the ledges together define an annular, or cylindrical, recess into which the ceramic fits.

Particular implementations of the presently disclosed RF window can be described in the ways set out below.

An RF window comprising a first and a second cavity with a plate of dielectric material positioned directly therebetween, wherein at least one of the first and second cavities reduces in diameter in a direction away from the plate of dielectric material, wherein the reduction in diameter begins at the plate.

An RF window comprising a first and a second waveguide structure, the first waveguide structure comprising a first cavity and the second waveguide structure comprising a second cavity, the RF window comprising a plate of dielectric material positioned between the first and the second cavity, wherein at least one of the first and second waveguide structure is configured such that the first or second cavity comprises a taper such that the first or second cavity reduces in diameter in a direction away from the plate, wherein the taper begins at the plate.

An RF window comprising a first and a second cavity with a plate of dielectric material positioned therebetween, wherein at least one of the first and second cavities comprises an inner face and an outer face, wherein the plate defines the inner face and the at least one of the first and second cavities decreases in diameter between the inner face and the outer face such that the at least one of the first and second cavities is substantially frustoconical.

An RF window comprising a first and a second cavity with a plate of dielectric material positioned therebetween, wherein at least one of the first and second cavities comprises an inner face and an outer face and comprises a taper such that the at least one of the first and second cavities decreases in diameter between the inner face and the outer face, wherein the plate defines the inner face and the taper begins at the plate.

The implementations disclosed herein have been described by way of example only, and the described implementations and arrangements are to be considered in all respects only as illustrative and not restrictive. It will be appreciated that variations of the described implementations and arrangements may be made without departing from the scope of the invention.

The invention claimed is:

1. An RF window comprising:

a first cavity;

a second cavity; and a plate of dielectric material positioned between the first cavity and the second cavity, wherein at least one of the first cavity or the second cavity comprises a taper such that the at least one of the first cavity or the second cavity reduces in diameter in a direction away from the plate of dielectric material, and wherein the taper begins at the plate, wherein the taper is a first taper of the first cavity, wherein the direction is a first direction, wherein the second cavity comprises a second taper such that the second cavity reduces in diameter in a second direction away from the plate of dielectric material, and wherein at least one of: a length of the first cavity along the first direction is less than a radius of the plate, or a length of the second cavity along the second direction is less than a radius of the plate of dielectric material.

2. The RF window of claim 1, wherein at least one of the first cavity or the second cavity is substantially frustoconical.

3. The RF window of claim 1, wherein the first direction and the second direction are antiparallel to one another.

4. The RF window of claim 1, wherein the RF window defines a central axis along which the direction lies, and wherein the central axis is an axis of rotational symmetry of the RF window.

5. The RF window of claim 4, wherein the taper forms an angle, internal to the cavity, of θ with the central axis, wherein the angle is $35° < \theta < 55°$.

6. The RF window of claim 1, wherein the RF window is configurable for use with RF at a transmission frequency, and one or both of:

a length of the first cavity along the first direction is less than a wavelength of the RF at the transmission frequency; and a length of the second cavity along the second direction is less than a wavelength of the RF at the transmission frequency.

7. The RF window of claim 1, wherein the plate of dielectric material is chamfered around one or more edges such that the plate of dielectric material is held in place between the first cavity and the second cavity by virtue of the first taper and the second taper.

8. The RF window of claim 1, wherein at least one of: the first cavity comprises a first inner face and a first outer face, or the second cavity comprises a second inner face and a second outer face.

9. The RF window of claim 8, wherein at least one of: the first direction is from the first inner face to the first outer face, or the second direction is from the second inner face to the second outer face.

10. The RF window of claim 8, wherein the plate of dielectric material defines the first inner face and the second inner face.

11. The RF window of claim 8, wherein at least one of: the first taper joins the first inner face to the first outer face such that the first cavity is substantially frustoconical or the second taper joins the second inner face to the second outer face such that the second cavity is substantially frustoconical.

12. The RF window of claim 8, wherein at least one of: a diameter of the first inner face is larger than a diameter of the first outer face, or a diameter of the second inner face is larger than a diameter of the second outer face.

13. The RF window of claim 1, further comprising:

a first waveguide structure; and a second waveguide structure;

wherein the first waveguide structure comprises the first cavity and the second waveguide structure comprises the second cavity.

14. The RF window of claim 13, wherein at least one of: the first waveguide structure comprises a first aperture to allow a RF to enter the first cavity or the second waveguide structure comprises a second aperture to allow the RF to exit the second cavity.

15. The RF window of claim 14, wherein at least one of: the first aperture defines a first outer face of the first cavity, or the second aperture defines a second outer face of the second cavity.

16. The RF window of claim 1, wherein the RF window is configured such that spherical RF modes form in the RF window as a RF propagates through the RF window.

17. The RF window of claim 1, wherein the RF window is configured to be coupled with a first connecting cavity and with a second connecting cavity such that, when so coupled, the RF window is positioned between the first connecting cavity and the second connecting cavity, and wherein the RF window is configured such that, when so coupled, an interface forms where the first connecting cavity meets the RF window, and, at the interface, a diameter of the first connecting cavity is less than a diameter of the first cavity.

18. An RF system comprising:

an RF window, the RF window comprising:

a first cavity;

a second cavity; and a plate of dielectric material positioned between the first cavity and the second cavity, wherein at least one of the first cavity or the second cavity comprises a taper such that the at least one of the first cavity or the second cavity reduces in diameter in a direction away from the plate of dielectric material, and wherein the taper begins at the plate of dielectric material, wherein the taper is a first taper of the first cavity, wherein the direction is a first direction wherein the second cavity comprises a second taper such that the second cavity reduces in diameter in a second direction away from the plate of dielectric material, and wherein at least one of: a length of the first cavity along the first direction is less than a radius of the plate, or a length of the second cavity along the second direction is less than a radius of the plate of dielectric material;

the RF system further comprising:

a first connecting cavity coupled to the first cavity; and a second connecting cavity coupled to the second cavity.

19. An RF window comprising:

a first cavity;

a second cavity; and a plate of dielectric material positioned between the first cavity and the second cavity, wherein at least one of the first cavity or the second cavity comprises a taper such that the at least one of the first cavity or the second cavity reduces in diameter in a direction away from the plate of dielectric material, and wherein the taper begins at the plate, wherein the RF window is configurable for use with RF at a transmission frequency, and one or both of:

a length of the first cavity along a first direction is less than a wavelength of the RF at the transmission frequency; or a length of the second cavity along a second direction is less than a wavelength of the RF at the transmission frequency.

* * * * *